US011288130B2

(12) United States Patent
Balcha et al.

(10) Patent No.: US 11,288,130 B2
(45) Date of Patent: Mar. 29, 2022

(54) CONTAINER-BASED APPLICATION DATA PROTECTION METHOD AND SYSTEM

(71) Applicant: Trilio Data, Inc., Framingham, MA (US)

(72) Inventors: Muralidhara R. Balcha, Holliston, MA (US); Prashanto Jairaj Kochavara, Boston, MA (US); David Safaii, Sherborn, MA (US); Vinod Patil, Vita Tal-Khanapur Dist-Sangli (IN); Ajay Nemade, Jaigaon (IN); Prafull Ladha, MP (IN); Abhisek Dwivedi, Maharashtra (IN); Madhur Nawandar, Pune (IN); Sanjay Singh Shekhawat, Jaipur (IN)

(73) Assignee: Trillo Data, Inc., Framingham, MA (US)

( * ) Notice: Subject to any disclaimer, the term of this patent is extended or adjusted under 35 U.S.C. 154(b) by 0 days.

(21) Appl. No.: 17/206,713

(22) Filed: Mar. 19, 2021

(65) Prior Publication Data

US 2021/0208974 A1  Jul. 8, 2021

Related U.S. Application Data

(63) Continuation of application No. 17/098,668, filed on Nov. 16, 2020.

(60) Provisional application No. 62/936,532, filed on Nov. 17, 2019.

(51) Int. Cl.
G06F 11/14 (2006.01)
G06F 9/455 (2018.01)

(52) U.S. Cl.
CPC ...... *G06F 11/1451* (2013.01); *G06F 9/45558* (2013.01); *G06F 11/1464* (2013.01);
(Continued)

(58) Field of Classification Search
CPC ............ G06F 11/1451; G06F 11/1469; G06F 11/1464; G06F 9/45558;
(Continued)

(56) References Cited

U.S. PATENT DOCUMENTS 10,025,836 B2  7/2018  Batchu et al.
2016/0132310 A1  5/2016  Koushik et al.
(Continued)

OTHER PUBLICATIONS

Palankar et al. "Amazon S3 for Science Grids: a Viable Solution?", DADC'08 Jun. 24, 2008. (Year: 2008).*
(Continued)

*Primary Examiner* — David Yi
*Assistant Examiner* — Zubair Ahmed
(74) *Attorney, Agent, or Firm* — Rauschenbach Patent Law Group, LLC; Kurt Rauschenbach (57) ABSTRACT

A computer-implemented method of data protection for containerized applications includes initiating a backup process for a containerized application comprising an application template, application information, and application data. An application template associated with the application is saved to a first repository. Application information is identified and saved to a second repository. A persistent volume containing the application data is identified and at least some of the application data from the persistent volume is saved to a third repository. The application is then restored based on the saved template, application information and application data.

10 Claims, 6 Drawing Sheets

(52) U.S. Cl.
CPC .. *G06F 11/1469* (2013.01); *G06F 2009/4557* (2013.01); *G06F 2009/45575* (2013.01)

(58) Field of Classification Search
CPC ... G06F 2009/45575; G06F 2009/4557; G06F 11/1458; G06F 2201/84; G06F 2201/815
USPC ........................................................ 711/162
See application file for complete search history.

(56) References Cited

U.S. PATENT DOCUMENTS

| | | |
|---|---|---|
| 2018/0137139 A1 | 5/2018 | Bangalore et al. |
| 2019/0065323 A1* | 2/2019 | Dhamdhere ........ G06F 11/3452 |
| 2019/0146885 A1* | 5/2019 | Chen ................... G06F 11/1446 |
| | | 714/15 |

OTHER PUBLICATIONS

International Search Report and Written Opinion received for PCT Patent Application No. PCT/US2020/060664, dated Mar. 2, 2021, 8 pages.

Dolan, Kerry, "Robin Storage for Containers: Enabling Stateful Applications on Kubernetes", Enterprise Strategy Group, Jul. 2019, 5 pages.

https://docs.robin.io/storage/5.3.4/apps.html#helm-releases; 30 pages, retrieved Nov. 15, 2021.

https://docs.robin.io/storage/5.3.4/backup.html; retrieved, 16 pages, Nov. 15, 2021.

* cited by examiner

CONTAINER-BASED APPLICATION DATA PROTECTION METHOD AND SYSTEM

CROSS REFERENCE TO RELATED APPLICATION

The present application is a continuation of U.S. patent application Ser. No. 17/098,668, filed on Nov. 16, 2020, entitled "Container-Based Application Data Protection Method and System", which claims benefit of U.S. Provisional Patent Application Ser. No. 62/936,532 filed Nov. 17, 2019, entitled "Container-Based Application Data Protection Method and System". The entire contents of U.S. patent application Ser. No. 17/098,668 and U.S. Provisional Patent Application Ser. No. 62/936,532 are all herein incorporated by reference.

The section headings used herein are for organizational purposes only and should not be construed as limiting the subject matter described in the present application in any way.

INTRODUCTION

OpenStack and other cloud-based deployments are growing at an astounding rate. Furthermore, these deployments are relying more on containerized applications. Market research indicates that a large fraction of enterprises will be deploying some form of cloud infrastructure to support applications services, either in a public cloud, private cloud or some hybrid of a public and a private cloud. This trend leads an increasing number of organizations to use this type of open-sourced cloud management and control software to build out and operate these clouds.

Data loss is a major concern for enterprises deploying this and other cloud management and control software. Unscheduled downtime has a dramatic financial impact on businesses. As such, data protection methods and systems are needed which recover from data loss and data corruption scenarios for application workloads executing on OpenStack® clouds and/or clouds that execute over containerized environments that use, e.g., Kubernetes® and/or OpenShift®.

One challenge is that the systems and applications being protected may scale to very large numbers of nodes and those nodes may be widely distributed. Thus, data protection systems must be able to scale rapidly both up and down to effectively work across cloud-based application deployments.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the system and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Data protection has become an important challenge as enterprises evolve OpenStack, OpenShift and/or Kubernetes and similar projects from evaluation to production. Corporations protect data using backup and recovery solutions to recover data and applications in the event of total outage, data corruption, data loss, version control (roll-back during upgrades), and other events. Software developers utilize data protection techniques for, e.g. version control, quality assurance and other development activities. Organizations typically use internal service-level agreements for recovery and corporate compliance requirements as a means to evaluate and qualify backup and recovery solutions before deploying the solution in production.

Cloud-based systems offer some application programming interfaces (APIs) that can be used to generate a backup, however, these APIs alone are not sufficient to implement and manage a complete backup solution. In addition, each cloud deployment is unique, at least in part because the systems are modular, with multiple options to implement cloud-based applications and containerized applications. Users have a choice of various hypervisors, storage subsystems, network vendors, projects and various open source management and orchestration platforms.

One feature of the methods and apparatus of the present teaching is that it supports data protection for hybrid clouds and also supports application-layer resiliency for container-based workloads. Hybrid clouds include cloud resources and services that combine at least one or more of private cloud resources, third-party cloud resources, public cloud resources, on-premise resources, and/or other cloud-based resources and services. Hybrid clouds may also include at least one or more cloud orchestration platforms.

The method and system of the present teaching supports data protection, application lifecycle management, infrastructure migration and infrastructure version management for hybrid cloud-based information systems that utilize container-based applications. The technology supports, for example, OpenStack and Red Hat® Virtualization environments, and allows systems to recover from disasters, migrate tenant workloads, move workloads to new infrastructures and migrate to new infrastructure software distributions.

In addition, the method and system of the present teaching provides data protection operations, including backup and restore, for distributed computing environments, such as private and public clouds, private data centers and hybrids of these environments. One feature of the method and system of the present teaching is that it can provide backup and restore operations using object storage systems as a backup target, or repository. For example, the system and method of the present teaching may utilize scalable cloud-based backup and restoration methods as described in U.S. Provisional Ser. No. 62/873,618, filed Jul. 12, 2019 and entitled "Scalable Cloud-Based Backup Method". The entire contents of U.S. Provisional Patent Application Ser. No. 62/873, 618 are incorporated herein by reference.

The application and system being backed up and restored in various embodiments of the present teaching can be a cloud computing system, such as, for example, a system that is executing a Kubernetes and/or OpenShift software platform in a cloud environment. Kubernetes is an open-source project and framework for cloud computing for container orchestration and automated application deployment, scaling and management. Kubernetes is also referred to as K8s. OpenShift is open source software offered by Red Hat that is a container application platform based on top of Docker® containers and Kubernetes container cluster manager platforms. It should be understood that the present teachings are not limited to use with Kubernetes and/or OpenShift software platforms and that they can apply to any type of cloud-based computing system and/or container environment that makes virtual servers and other virtual computing resources available as a service or platform to customers.

Methods and systems of the present teaching apply to back-up and restore of applications and associated workloads implemented in any combination of the configurations described herein. As will be clear to those skilled in the art, various aspects of the system and various steps of the method of the present teaching are applicable to various types of computing environments, including computing resources and services available in private and public data centers and/or cloud and/or enterprise environments. Various aspects of the system and various steps of the method of the present teaching are applicable to various known control and management software platforms and services.

The present teaching is described herein with respect to both applications and workloads. In general, an application represents software that performs a desired function. A workload, which is sometimes referred to as an application workload, also includes all the resources and processes that are necessary, or utilized, to make the application run. A feature of the data protection method and system of the present teaching is that it not only provides for data protection of the application, but also for data protection of the workload associated with that application. A user or end system may, in some methods, specify the scope of the data protection. Thus, reference to application, application workload or workload in a particular description does not necessarily limit the scope of the present teaching. However, an important feature of the present teaching is the recognition that information systems are now reliant on workloads to perform computing tasks, and these workloads represent a more complex set of functions and services than, for example, a set of individual applications and associated data that run on individual machines. Thus, backing up, restoring and/or migrating a computer system is more than backing up a collection of applications and/or data. It also requires information on the management structure, connectivity and/or associated data to be included as part of the backup process. The computer-implemented method of data protection for containerized applications of the present teaching addresses the challenges in providing effective and complete backup, migration, and/or restoration of the applications and services that run on these platforms.

One feature of the present teaching is the recognition that modern applications running on virtual machines and/or using containers have an associated and integral management structure/information that is needed to execute them. This management structure is provided, in some cases, by templates. An example template is the Helm® chart in Kubernetes. An effective and efficient backup and restoration solution needs to appropriately discover and maintain this additional information, as well as the associated data of the application. Thus, some embodiments of the present teaching create a backup manifest that maintains the relevant information to back up and/or restore not only application data, but necessary configuration information to run the application at the desired point in time.

Figure 1A:
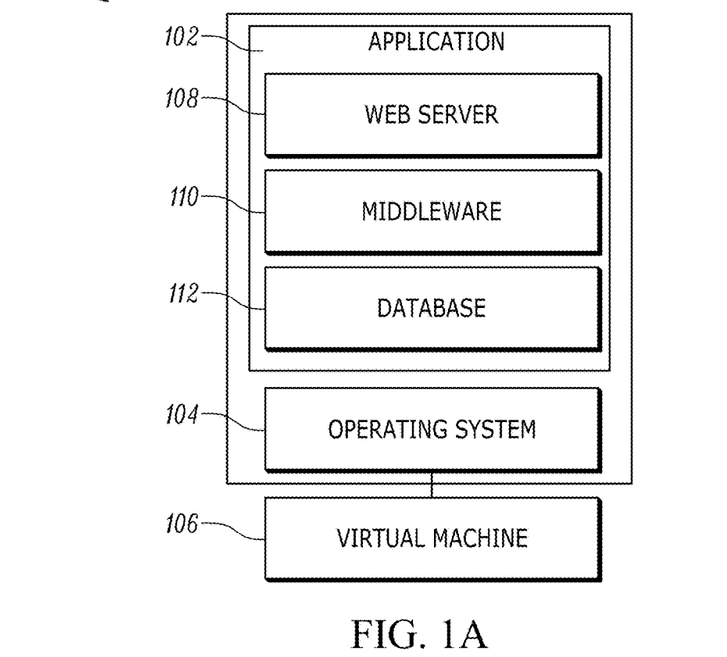
FIG. 1A illustrates a stack for an application that executes using a virtual machine.

Another feature of the present teaching is that it supports application workload backup and restoration for applications running on virtual machines. FIG. 1A illustrates a stack 100 for an application that runs using a virtual machine. As can be seen from the figure, the application 102 is set monolithically over the operating system 104 that is executing on a virtual machine 106. The application services include web server 108, middleware 110, and database 112 services that run using the operating system 104.

Figure 1B:
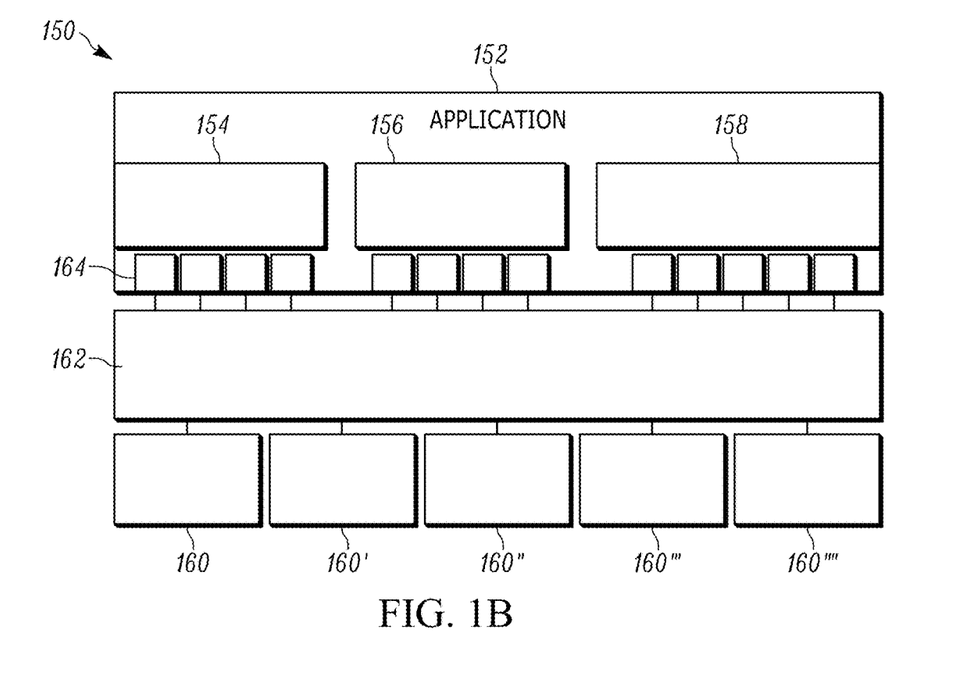
FIG. 1B illustrates a stack for a containerized application that executes using a container system.

Another feature of the present teaching is that it supports application workload backup and restoration for applications running using containers that execute on virtual machines and/or physical machines. FIG. 1B illustrates a stack 150 for a containerized application 152 that runs using a container system. The application 152 includes microservices 154, 156, 158 connected to processing machines 160, 160', 160'', 160''', 160'''' via a container management system 162. In various embodiments, the processing machines 160, 160', 160'', 160''', 160'''' can be physical machines or virtual machines or a combination. The container management system 162 is connected to the various services 154, 156, 158 of the application 152 using various computing units 164. The computing units 164 generally include one or more containers that are typically collocated and scheduled as a unit to support a particular compute capability, or set of capabilities (e.g. networking, processing, storage) that are needed for the various services 154, 156, 158 to which they connect. The container management system 162 manages the computing units 164 that run on the computing resources provided by the underlying processing machines 160, 160', 160", 160''', 160''''.

Figure 2:
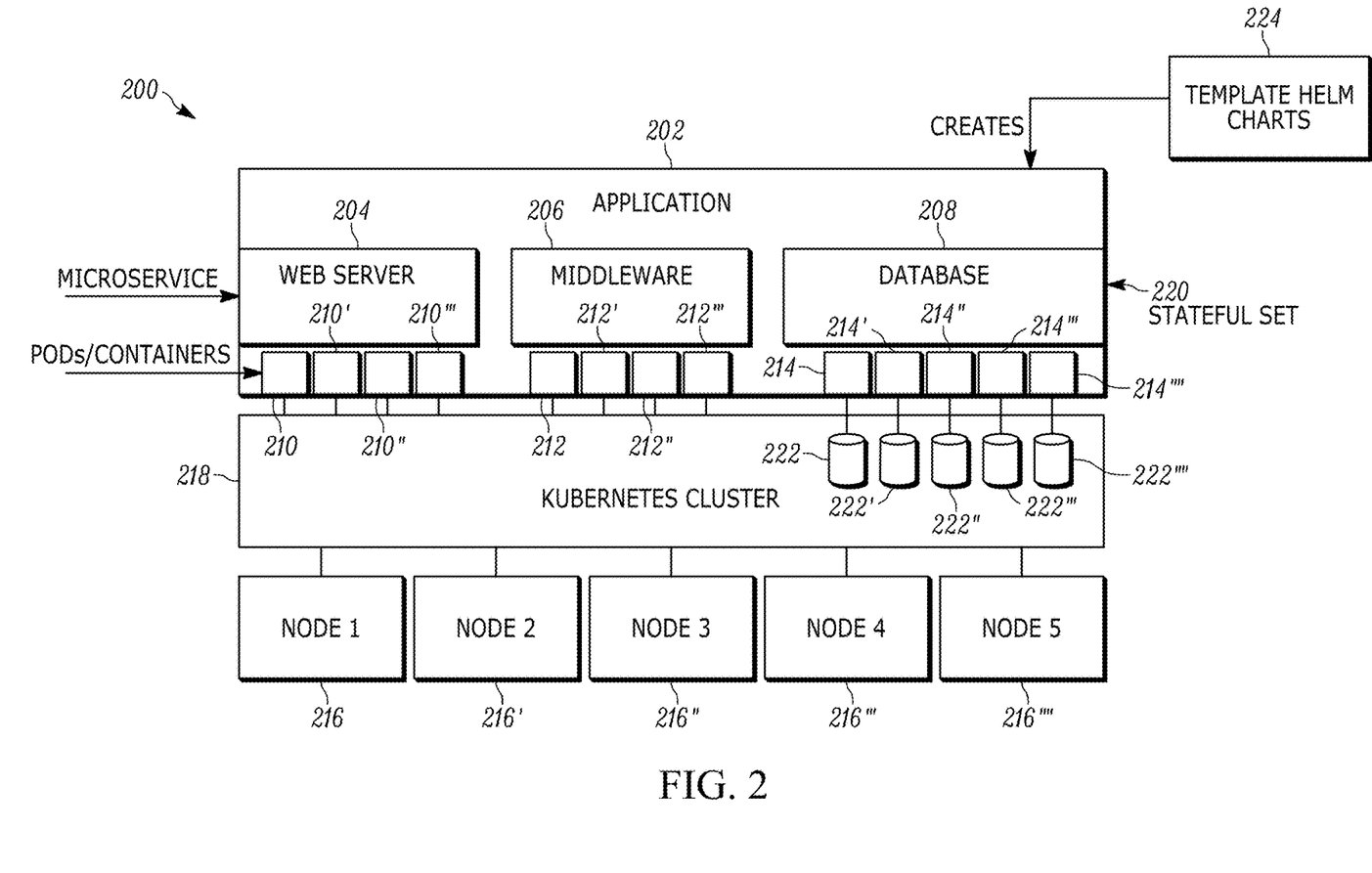
FIG. 2 illustrates a containerized application stack for an application to be backed up executing a Kubernetes cluster of the present teaching.

FIG. 2 illustrates a containerized application stack 200 for an application to be backed up executing using a Kubernetes cluster of the present teaching. The application 202 includes three microservices, a web server service 204, a middleware service 206, and a database service 208. Each microservice 204, 206, 208 runs using multiples pods. The web server service 204 uses four pods 210, 210', 210", 210'''. The middleware service 206 uses four pods 212, 212', 212", 212'''. The database service 208 uses five pods 214, 214', 214", 214''', 214''''. In some embodiments, each pod comprises one or more Docker containers, which is a set of coupled software-as-a-service and platform-as-a-service products that use operating-system-level virtualization to develop and deliver software in containers. The pods 210, 210', 210", 210''', 212, 212', 212", 212''', 214, 214', 214", 214''', 214'''' run on five Kubernetes nodes 216, 216', 216", 216''', 216'''', that may be virtual processing machines or physical processing machines. A Kubernetes cluster 218 manages the pods 210, 210', 210", 210''', 212, 212', 212", 212''', 214, 214', 214", 214''', 214'''' and the nodes 216, 216', 216", 216''', 216''''. The Kubertnetes cluster 218 includes a control plane, that is a collection of processes executing on the cluster, and a master that is a collection of three processes that run on a single one of the nodes 216, 216', 216", 216''', 216'''' on the cluster. The three processes for the master are an API server, controller manager, and a scheduler.

Each application pod 210, 210', 210", 210''', 212, 212', 212", 212''', 214, 214', 214", 214''', 214'''' may have an associated stateful set, and thus, an associated persistent storage volume. This is sometimes referred to as a persistent volume or PV.

Comparing stack 200 with the generalized container application stack 150 of FIG. 1B, and referring to both FIG. 1B and FIG. 2, the computing units 164 are equivalent to the pods 210, 210', 210", 210''', 212, 212', 212", 212''', 214, 214', 214", 214''', 214''''. The management system 162 is equivalent to the Kubernetes cluster 218. The underlying processing machines 160, 160', 160", 160''', 160'''' are equivalent to the nodes 216, 216', 216", 216''', 216''''.

Managing storage is distinct from managing computation. A persistent volume (PV) may be a piece of storage in a Kubernetes cluster. The Kubernetes application 202 has a stateful set 220 for the database service 208. The database service 208 pods 214, 214', 214", 214''', 214'''' require ordering and uniqueness. Each pod 214, 214', 214", 214''', 214'''' has an associated persistent volume 222, 222', 222", 222''', 222'''' in the Kubernetes cluster 218. In some embodiments, the persistent volumes are pieces of storage in the cluster that may be provisioned statically by an administrator, or dynamically provisioned using storage classes, or profiles of the storage based on, for example, quality of service, type, and/or backup or other policies.

In some embodiments, the application 202 is created from a template Helm chart 224. Helm is an open-source package manager for Kubernetes. Helm uses Helm charts, such as template Helm chart 224. In general, Helm charts are used to define, install and upgrade Kubernetes applications. Each Helm chart is a collection of files in a directory that describe a related set of Kubernetes resources. Helm charts can be simple or complex where they contain many resources. Each Helm chart contains version information in a Chart.yaml file. One feature of the system and method to protect data of the present teaching is that it can be run on a Kubernetes cluster.

The application 202 described in connection with FIG. 2 may be an application that is being backed up and/or restored by various embodiments of the method and system of the present teaching. In addition, or instead, the application 202 described in connection with FIG. 2 may be an application that is executing the backup and/or restore function of various embodiments of the method and system of the present teaching. A feature of applications configured according to an embodiment of FIG. 2 is a cloud-native system that can scale rapidly and efficiently up to large sizes and down to small sizes of nodes and/or other computing elements.

Figure 3:
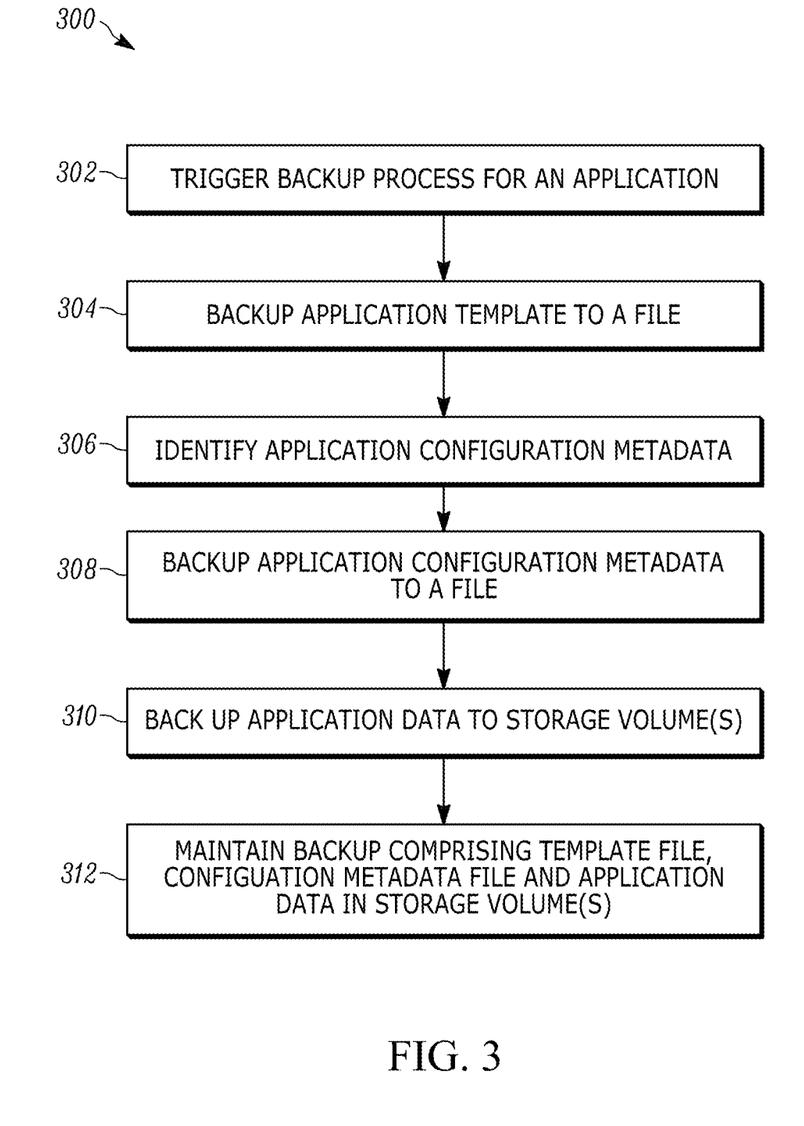
FIG. 3 illustrates a flow diagram for an embodiment of a method of container-based application data protection backup of the present teaching.

FIG. 3 illustrates a flow diagram 300 for an embodiment of a method of container-based workload data protection backup of the present teaching. The application to be backed up is defined by a template. The template can include, for example, the number of virtual machines (VMs), what kind of VM, VM operating system, network identifiers for one or more networks being used, storage identifiers for one or more storage systems being used, various IP addresses, and/or other details about the configuration of the infrastructure that is supporting the application. The templates can be, for example, Helm charts (Kubernetes), terraforms (Hashi Corp.), cloud formation (Amazon), and/or Heat (Open Stack).

In a first step 302, a backup process is triggered. The trigger for a backup can take many forms including, for example, being a scheduled trigger, trigger or triggers that are defined by a policy, user initiated, one-click initiated, and other forms of triggers. The trigger may occur on a regular time pattern, or the trigger may occur at random times. The trigger may be initiated by a command in a Helm chart or other template.

In a second step 304, the defined application template is backed up to a file. In a third step 306, the application's configuration metadata is identified. This configuration identification step 306 may include, for example, a discovery process on the cloud-based infrastructure to determine the application's configuration metadata. The discovery process in some embodiments is guided by the application template information. In a fourth step 308, the applications' configuration metadata identified in the third step 306 is backed up to a file.

In a fifth step 310, the application data is backed up to a storage volume, or volumes. In some embodiments, the stateful set of services of the application are determined and the data in the storage volumes associated with the application are stored in a backup storage volume. In a sixth step 312, the backup comprising the template file, the configuration metadata file, and the application data is maintained.

The backup processes used in the backup steps of the method flow diagram 300 can utilize, for example, the backup process described in U.S. Provisional Patent Application Ser. No. 62/873,618, which is incorporated herein by reference. The backups may be incremental or full backups at various back up times, as understood by those skilled in the art.

Figure 4:
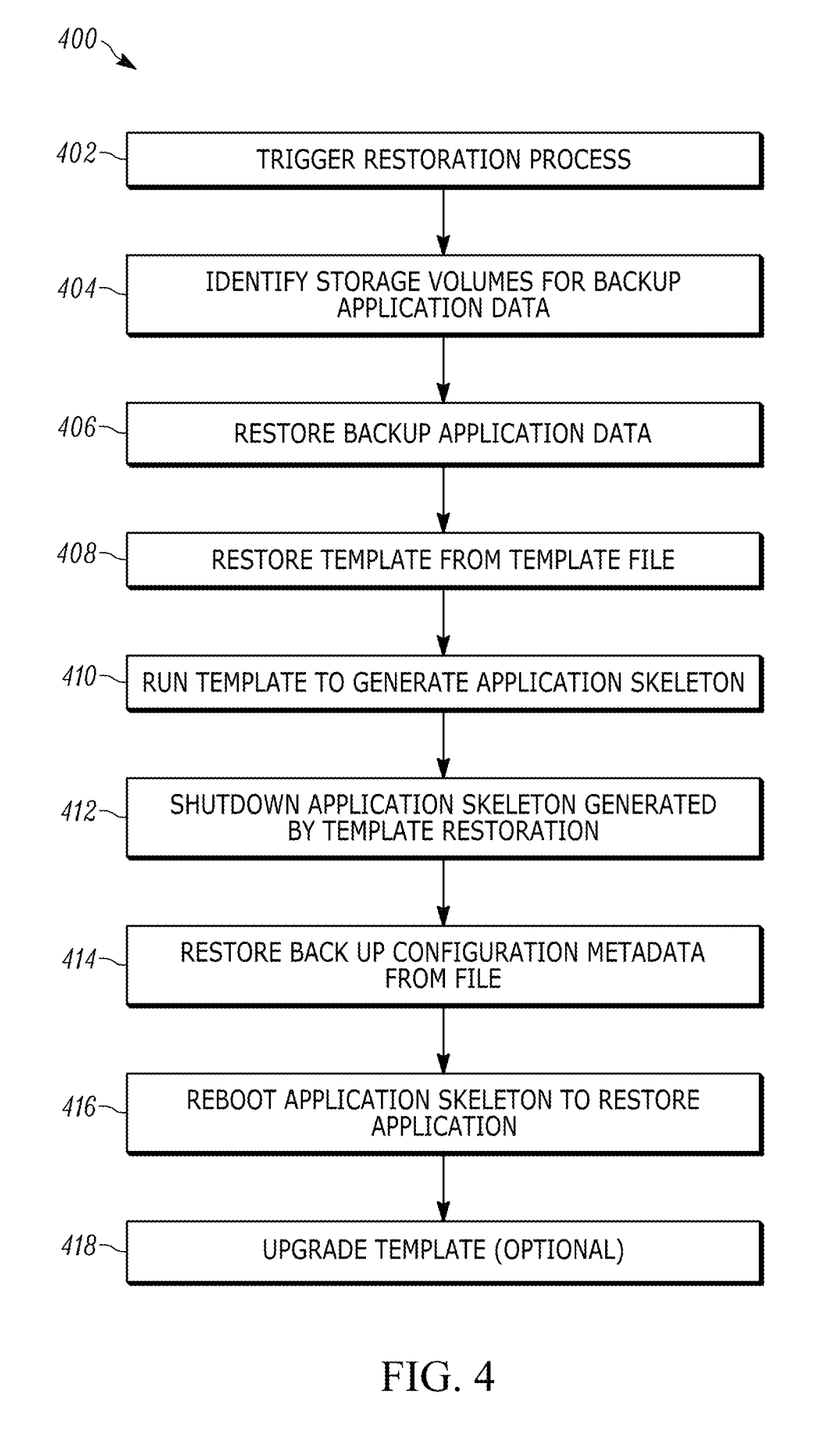
FIG. 4 illustrates a flow diagram for an embodiment of a method of container-based application data protection restore of the present teaching.

FIG. 4 illustrates a flow diagram 400 for an embodiment of a method of container-based workload data protection restore of the present teaching. The restore process in flow diagram 400 can work with the files and backup storage volumes that were generated in the method of container-based workload data protection backup described in connection with FIG. 3.

Referring to both FIGS. 3 and 4, in a first step 402, a restore process is triggered. The trigger for the restoration can take many forms including, for example, being a scheduled trigger, trigger or triggers that are defined by a policy, user initiated, one-click initiated, and other forms of triggers. The trigger may occur on a regular time pattern, or the trigger may occur at random times. The trigger may be initiated by a command in a Helm chart or other template.

One feature of the present teaching is that it supports a simple restore initiation. In some embodiments of the method of the present teaching, an entire application is restored from a point-in-time. In other embodiments, a policy-based global job scheduling initiates the restoration. In yet other embodiments, restoration is initiated with a single click. In some embodiments, restoration is provided with a copy to a new location or availability zone. Also, in some embodiments, the restore process migrates an application or applications to a new Kubernetes cluster.

In a second step 404, the restore storage volumes for the application data being restored are identified. In a third step 406, the application data is restored from backup storage volumes. The backup storage volumes and backed up application data may have been generated in a backup step 310 and maintained in step 312 of the backup method flow diagram 300.

In a fourth step 408, the template is restored using the template file. Referring to FIG. 3, the template file may have been created by a backup process step 304 and maintained in step 312 in the backup method flow diagram 300. In a fifth step 410, the template file is run to generate an application skeleton. By application skeleton, we mean the application does not yet have any data. In a sixth step 412, the generated application skeleton is shut down.

In a seventh step 414, the backup configuration metadata is restored from a file. Again, referring to FIG. 3, the file may be the application configuration metadata file generated in step 308 and maintained in step 312 of the backup method flow diagram 300.

In an eighth step 416, the application skeleton is rebooted. The reboot of the application skeleton thus successfully restores the application and its associated stateful information associated with the particular backup information (files and data in storage volumes) that was chosen to be restored. In some embodiments, various steps of the method utilize the restore techniques as described in U.S. Provisional Patent Application Ser. No. 62/873,618. Restorations can proceed with any backup point in time as desired and available.

In an optional step 418, the application template may be upgraded. For example, an upgrade can be desired if a new version of software involved in the application workload is available, and the upgrade will move the version of the restored upgraded application to the new version.

Figure 5:
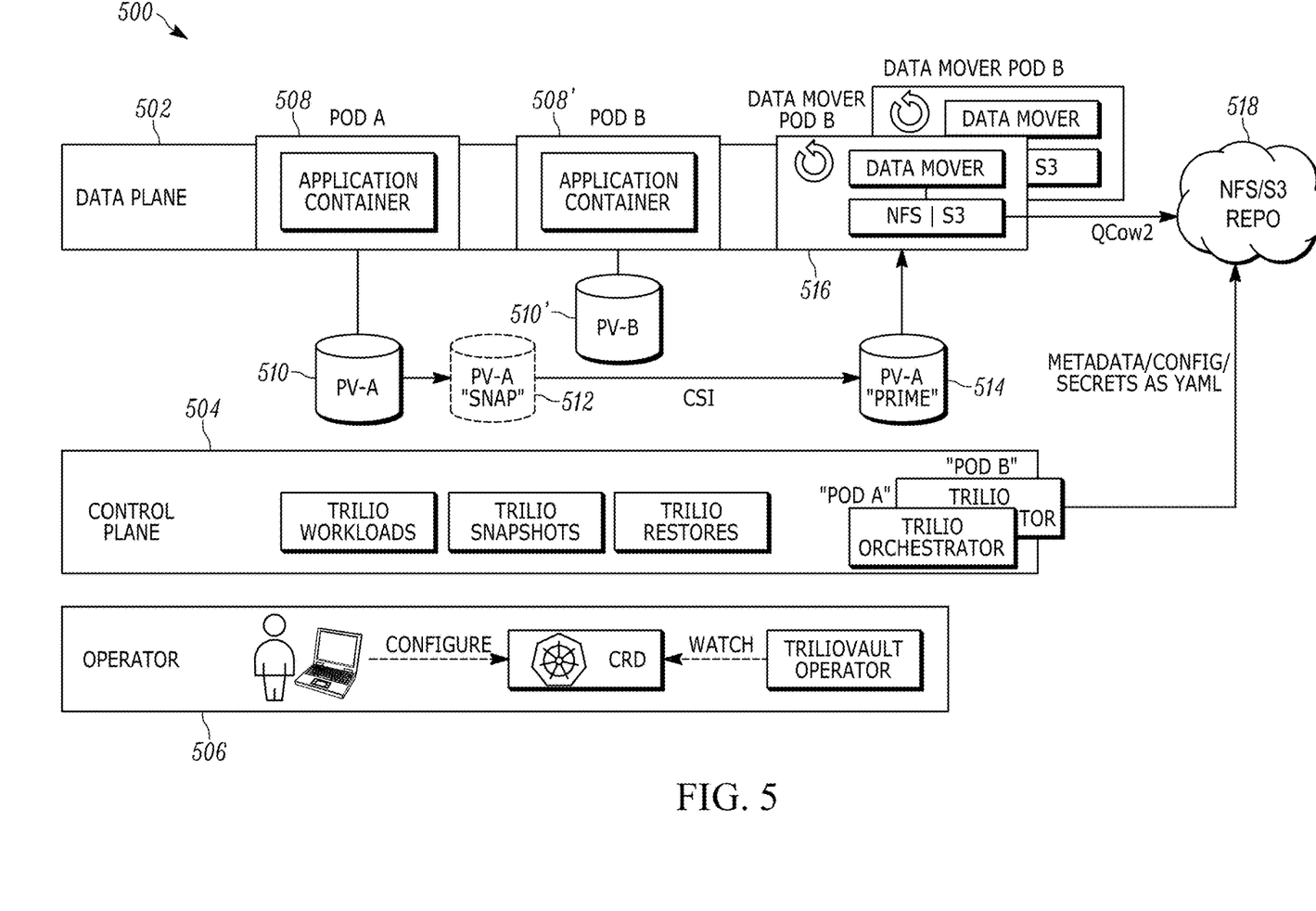
FIG. 5 illustrates a system diagram for an embodiment of a container-based application data protection backup and restoration of the present teaching.

FIG. 5 illustrates a system diagram 500 for an embodiment of container-based workload data protection backup and restoration of the present teaching. Embodiments of the method and system for data protection backup and restoration of the present teaching includes not only traditional backup and restoration of the data plane 502, but also backup of the control plane 504 and of the operator layer 506 information. This approach is particularly useful for systems that run and/or develop applications using a container-based approach. Application pods 508, 508', Pod A and Pod B, have stateful information data in persistent volumes 510, 510', PV-A, PV-B. In some embodiments the persistent volumes 510, 510' are network file system (NFS). For a data backup, in some embodiments a snapshot 512 of PV-A volume 510 is created and a new persistent volume 514 is created from the snapshot. The new persistent volume 514 is attached to a data mover pod 516. The data mover service copies the persistent volume 514 to a repository 518. The system is flexible and supports multiple protocols for distributed storage to act as a repository 518. The repository 518 may be, for example, Amazon simple storage service (S3) or another repository. In some embodiments the file format may be Qcow2 for backup images.

For the control plane 504 backup and restoration, a variety of application-related configuration information, secrets information (e.g. passwords, keys and privileges), and metadata are discovered and backed up to the repository 518. For example, this information may be stored in the backup repository 508 as an application information file.

At the operator plane 506, application templates are associated with the application to be backed up. These may include a Helm chart or other template. The template may include common resource definitions and other information about the application. This information may be stored as a template file and stored in the repository 518. Thus, one key advantage of the data protection system and method of the present teaching is that, for a particular application to be backed up, not only is the application data backed up, but the template is backed up as well as the configuration metadata information and relevant application information. This approach supports fast and efficient backup of applications that run on containers.

Figure 6:
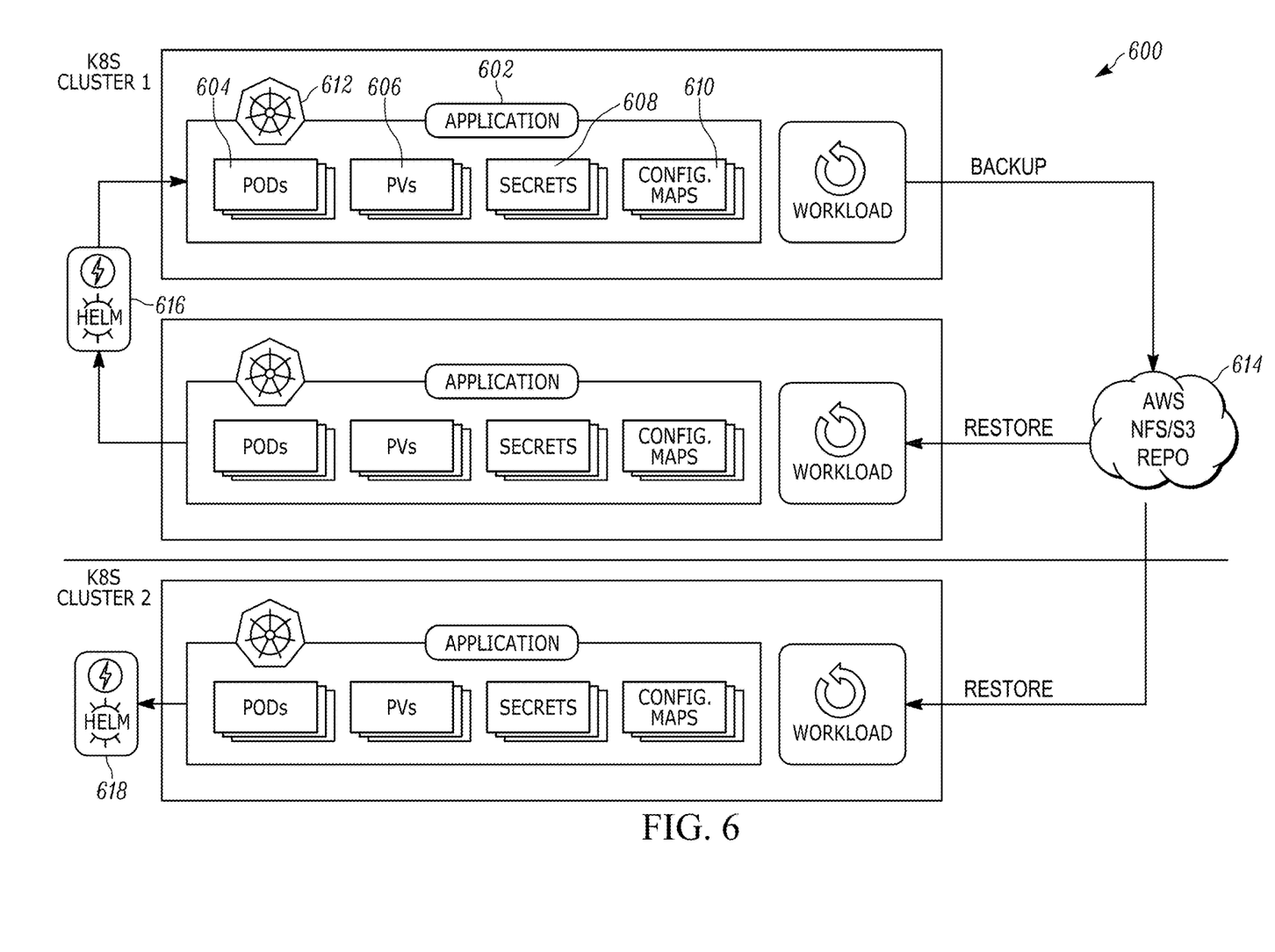
FIG. 6 illustrates a system diagram for an embodiment of a container-based application data protection backup and restoration to different clusters of the present teaching.

Another feature of the methods and apparatus of the present teaching is that a restore operation can restore an application to the same cluster, and/or to a different cluster. FIG. 6 illustrates a system diagram 600 for an embodiment of container-based workload data protection backup and restoration to different clusters of the present teaching. An application 602 comprises one or more pods 604, one or more persistent volumes 606, one or more secrets 608 information, one or more configuration maps 610 and is defined by template 612, which can be a Helm chart. For example, this application can be executing on a Kubernetes Cluster 1 and can be backed-up to a repository 614. This application 602 is then restored using this backup to Kubernetes Cluster 1 616. In addition, or instead, the restore steps include restoring the application to a different cluster, Kubernetes Cluster 2 618.

Some embodiments of the present teaching use the Helm parser and/or application configuration reader/loaders at setup. A user application deployed using Helm charts should be parsed and generate viable WorkloadCRDs (common resource descriptors). An example workflow proceeds as follows. The user can have following scenarios: 1) application with multiple releases, or 2) application with multiple revisions. An assumption is that a single release will be considered as a single workload.

Creating a workload out of the user application proceeds as follows: 1) get the latest version of the release; 2) since Helm release names are unique across K8s clusters, perform a one-to-one mapping for RELEASE_NAME→TRILIO-VAULT_WORKLOAD_NAME; 3) get a list of all the PVs and PVC; and 4) backup the release content directly since it can be created with no dependencies and will be managed differently (release content includes: templates—all the K8s resources like Pods, Sts, Dep, Svc, PV, PVC, Crds, etc., chart metadata, manifests, configuration, dependencies, files, backup PVs and PVC data, as appropriate).

For embodiments of the present teaching that use Helm charts, the Helm Go Client can be used for all the transactions with Helm charts. Below is an example structure of Helm chart release content stored inside the storage backend:

| Chart Struct |
|---|
| ```
type Chart struct {
  // Contents of the Chartfile.
  Metadata *Metadata 'protobuf: "bytes, 1, opt, name=metadata, proto3"
json: "metadata, omitempty" '
  // Templates for this chart.
  Templates [ ] *Template 'protobuf: "bytes, 2, rep, name=templates, proto3"
json: "templates, omitempty" '
  // Charts that this chart depends on.
  Dependencies [ ] *Chart 'protobuf: "bytes, 3, rep, name=dependencies, proto3" json: "dependencies, omitempty" '
  // Default config for this template.
  Values *Config 'protobuf: "bytes, 4, opt, name=values, proto3"
json: "values, omitempty" '
  // Miscellaneous files in a chart archive,
  // e.g. README, LICENSE, etc.
  Files                          [ ] *any.Any
'protobuf: "bytes, 5, rep, name=files, proto3" json: "files, omitempty" '
  XXX_NoUnkeyedLiteral           struct { }      'json: "-" '
  XXX_unrecognized               [ ] byte        'json: "-" '
  XXX_sizecache                  int32           'json: "-" '
}
``` |

A Helm Client can be created and the latest revision data for a helm release can be obtained in the following way:

| Helm Client |
|---|
| ```
import "k8s.io/helm/pkg/helm"
  func main ( ) {
    const tillerHost = "10.1.1.9:44134"
    const releaseName = "amber-ostrich"
    helmClient := helm.NewClient (helm.Host (tillerHost))
    releaseData, _ := helmClient.ReleaseContent (releaseName)
  }
``` |

In some methods, all the data that was returned from the above call will be backed up during the application backup.

In some methods, developing Helm charts utilize the following Helm basic commands: 1) list current installed charts: helm list; 2) run lint on the local charts: helm lint ${chart_path}; 3) get all the generated manifests for a release: helm get manifest $release_name; 4) install charts with --dry-run—use for easy debugging: helm install -debug --dry-run ${chart_path}; 5) get all the configmaps created by Tiller in its namespace (by default kube-system): kubectl get configmap -n kube-system -l "OWNER=TILLER"; and 6) helm get ${release_name}.

The storage backend is, by default: --storage=configmap, used when Helm+Tiller are initialized. To change Tiller storage back end utilize: helm init --override 'spec.template.spec.containers[0].command'='{/tiller, --storage=secret}'

Helm built-ins include:
.Release
  .Name
  .Time
  .Namespace
  .Service—always "Tiller"
  .Revision—starts at 1 and ++ on each helm upgrade for the same release
  .IsInstall—true if installing for first time
  .IsUpgrade—true if upgrade/rollback
.Values—values.yaml
.Chart—Chart.yaml Some embodiments utilize the following for local development: 1) get tiller storage backend (k8s configmaps, k8s secrets, any other sql storage); 2) get list of releases from the tiller helm history $release_name; and 3) getting release data from the release configmap. In addition, for decode of the chart release see the following example:

| Local decode helm chart release |
|---|
| ```
git clone https://github.com/google/protobuf/
home/user/go/src/github.com/
  git clone https://github.com/kubernetes/helm/
home/user/go/src/github.com/
  data=$ (kubectl get cm ${release_name} .${release_version} -n kube-system -o=jsonpath= ' { .data.release} ' )
  echo ${data} | base64 -d | gunzip | protoc -I/
home/user/go/src/github.com/helm/_proto/ -I/
home/user/go/src/github.com/protobuf/src/ --decode
hapi.release.Release /home/user/go/src/github.com/helm/_proto/hapi/**/*
  protoc --decode_raw.
``` |

An operator is a method of packaging, deploying and managing a Kubernetes application. A Kubernetes application may be described as an application that is both deployed on Kubernetes and managed using the Kubernetes APIs and kubectl tooling. The operator software development kit (SDK) enables developers to build operators based on their expertise without requiring knowledge of the complexities of the Kubernetes API. The operator lifecycle management oversees installation, updates, and management of the lifecycle of all of the operators (and their associated services) running across a Kubernetes cluster. Possible user-deployed operators have types, for example: Go, an operator that has the business logic written in Golang to deploy and manage the applications, Helm, and Ansible. Note that a single operator can manage multiple instances of an application.

As an example use case, a user creates an upper level abstraction via operator to deploy and manage other resources that are frequently needed to created/deployed in a specific manner onto a K8s cluster. For instance, the user creates an operator which will deploy and manage a monitoring stack consisting of Prometheus® and Grafana®. Another example would be the user creates an operator to manage and deploy etcd-clusters as a datastore.

As a second example use case, the user also creates an operator that manages and updates a custom application that is being tracked in some upstream artifact repo eg. docker.io, quay.io, gcr.io. If any changes are made upstream, the operator can have the business logic to fetch latest changes and redeploy or upgrade the application in a custom manner so that minimal human intervention is required.

The method and system of the present teaching creates a workload out of an operator in the following way: First, all the resource that comprise a single instance application instance managed by the operator are parsed or discovered. The high-level workflow includes taking user inputs. This includes the name and label of the operator that needs to be backed up and also the name and label of the instance of the application managed by the operator that needs to be backed up. Second, all the resources are obtained under both of the names and labels sets described above. The operator resources are primarily operator deployment definitions and Role-Based Access Control (RBAC) policies set to operators including role, role binding, cluster role, cluster role binding, and service account. Other operator resources include Common Resource Descriptor (CRD) definitions, although in some embodiments this is not needed because the operator deployment itself creates the CRD and registers it to Kubernetes API server. The application instance resources include custom resource object yaml/json and persistent volumes (PV) and persistent volume claims (PVC). Third, a workload CRD is created from the above list of resources.

Note that for parsing an operator application, some embodiments only use user-provided application labels because they are the only consistent entity throughout the application. It is assumed that these labels will already be present, i.e. created by a user, on all the application resources. If this is not the case, then that label-less resource might not get added or discovered at backup. There is also an assumption that there is a one-to-one mapping between the created workload and the operator application instance.

As an example of a deployed Prometheus operator, following is a basic operator stack. This assumes a user provides a label via a user interface or command line interface. The following is for the operator, app.kubernetes.io/name=Prometheus-operator, and for the application instance, Prometheus=primary-prom:

Step-1: Getting Operator Resources Like Deployment, Statefulset, Configmaps, Secrets, Services

| Getting operator resources |
| --- |
| user@user-ThinkPad-E480:~ kubectl get all --selector=app.kubernetes.io/name=prometheus-operator<br>NAME                                               READY      STATUS     RESTARTS     AGE<br>pod/prometheus-operator-7ff5cf6455-zmm9b           1/1        Running    0            26h<br>NAME                           TYPE         CLUSTER-IP    EXTERNAL-IP   PORT(S)     AGE<br>service/prometheus-operator    ClusterIP    None          \<none\>        8080/TCP    26h<br>NAME                                         READY    UP-TO-DATE    AVAILABLE    AGE<br>deployment.apps/prometheus-operator           1/1      1             1            26h<br>NAME                                                DESIRED   CURRENT   READY    AGE<br>replicaset.apps/prometheus-operator-7ff5cf6455      1         1         1        26h |

Step-2: Getting RBAC Policies

| Get operator rbac policies |
| --- |
| user@user-ThinkPad-E480:~$ kubectl get<br>sa, roles, rolebindings, clusterroles, clusterrolebindings --selector=app.kubernetes.io/name=prometheus-operator<br>NAME                                    SECRETS    AGE<br>serviceaccount/prometheus-operator      1          25h<br>NAME                                                               AGE<br>clusterrole.rbac.authorization.k8s.io/prometheus-operator          25h<br>NAME                                                                      AGE<br>clusterrolebinding.rbac.authorization.k8s.io/prometheus-operator          25h |

A following step three involves Getting CustomResource object. When the Prometheus operator is installed, it creates five different CRDs. As a result, Prometheus CRD is created and the operator will start to watch for a kind, Prometheus. Also, when the ServiceMonitor CRD is created, the operator will start to watch for a kind, ServiceMonitor. This continues for various kinds. In this way, the moment a CRD is created, the operator starts to watch for the type of resource that is registered to the ApiServer.

In some embodiments, a CRD is not backed up because when an operator is installed the CRD is created and registered to the API server by the operator. By installed we mean when an operator deployment is created. The moment a CRD is created the operator starts to watch a type of resource that is registered to the API server.

Some embodiments get custom resource objects through a process of first getting any resource from user-provided labels in an application instance, then getting owner reference for the custom resource and then getting the custom resource object. See the following:

| Get application resources from labels |
| --- |
| user@user-ThinkPad-E480:~$ kubectl get all --selector=prometheus=primary-prom |

| Get application resources from labels |
|---|
| NAME                           READY   STATUS    RESTARTS   AGE
pod/prometheus-primary-prom-0   3/3     Running   1          27h
NAME                                        READY   AGE
statefulset.apps/prometheus-primary-prom    1/1     27h
  user@user-ThinkPad-E480:~$ kubectl get statefulset.apps/prometheus-primary-prom -o jsonpath= ' { .metadata.ownerReferences [ ] . kind} '
  Prometheus
  user@user-ThinkPad-E480:~$ kubectl get Prometheus --selector=prometheus=primary-prom -o yaml > cr_backup.yaml |

In this example, the owner reference is obtained from statefulset, but this might not always be the case. Some methods query all the higher-level abstraction objects, i.e. statefulset, deployments, configmap, secrets, as appropriate and available, first and then the lower ones, i.e. pods, unless other resources are not there, so that queries are minimized and query time is reduced.

An example of getting data backups proceeds through steps of getting persistent volumes and persistent volume claims to backup data as follows:

| Get PV,PVC resources |
|---|
|   user@user-ThinkPad-E480:~$ kubectl get pv,pvc --selector=prometheus=primary-prom |

Data protection systems of the present teaching capture, for example, applications, Helm Charts, network topology, storage volumes, security groups and users, VMs (single and multiple), data and/or metadata. In addition, data protection systems of the present teaching restore for operational recovery, disaster recovery, and/or test and development purposes. Restore can also apply to moving to new availability zones and/or new clouds. The restore can operate as a file and/or folder-level restore. The restore function can be initiated by a variety of users including, for example, cloud administrators, backup administrators, and/or any privileged tenant.

Another feature of the data protection system and method of the present teaching is that a user does not lose track of an application that is not under a single management umbrella. By backing up the templates, configuration metadata and data together, the system advantageously maintains an application at each backup time despite how it is deployed and how many various management domains it crosses. The application can be restored to any point in time that is available as a backup. Once the system is restored, a user or system may advantageously change, e.g. upgrade, the template as desired. For example, to upgrade to a new version of an operating system or other software.

The data protection method and system of the present teaching advantageously solves the challenge of application backup and restoration associated with versioning. This is because the configuration metadata will contain the versioning information in the backup. This advantage makes the data protection system and method of the present teaching well suited to development operations, because it allows users to back up applications at specific points in time and subsequently restore to a particular desired point in time. The data protection system and method of the present teaching is also well suited to traditional IT management data protection and data recovery applications.

Another feature of the system and method of the present teaching is that it can operate as self-service in multi-tenant environments, and also supports high degrees of scale. Some embodiments support Red Hat OpenShift Container Platform. The system can be open and provide forever-incremental backup schema that can support any storage target. The system can provide point-in-time backup and recovery and can be deployed and managed through Operators or Helm. The system can provide monitoring and metering to Prometheus, Fluentd, and Istio. The system can also be integrated with existing, known, cloud lifecycle management systems. In addition, the system can provide native integrations to the container storage interface (CSI) framework, and therefore provides CSI compatibility.

One feature of the present teaching is that it supports self-service management. In some embodiments, namespace users can restore applications on-demand. In some embodiments, the system is integrated directly into Kubernetes and Openshift. In various embodiments, back up is sent to NFS, Amazon S3®, and/or Ceph S3 repositories. In some embodiments, the system is deployed with Operator Helm charts. In some embodiments, the system is monitored using monitoring and metering with Prometheus. In some embodiments, logging and tracing are provided using tracing with, for example, Fluentd and Istio data collectors.

Another feature of the present teaching is that very little if any centralized information technology administration is needed, thereby reducing total cost of ownership. Incremental backups can be automatically scheduled on a pre-defined or on-demand basis. Backups can be easily tested prior to recovery and can be stored in the open QCOW2 format. The system may quickly recover any Kubernetes, or other kind, of containerized application. The system may selectively restore containers and applications to the same or new name space.

Another feature of the present teaching is the support of non-disruptive backup. The system can capture incremental changed blocks of workloads via a data mover. The system can capture an entire application. The system can support incremental forever and/or synthetic full images. The data protection method and system of the present teaching can support a variety of known OpenStack distributions, operational development platforms, storage targets, applications, and management systems.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be

What is claimed is:

1. A computer-implemented method of data protection for containerized applications, the method comprising:
   a) initiating a backup process for a containerized application having at least two releases, the containerized application comprising an application template comprising a Helm chart, application information comprising a common resource descriptor (CRD), and application data, the application template further comprising an operator that manages an upstream artifact that is separate from but connected to the containerized application;
   b) automatically redeploying or upgrading the application based on the upstream artifact, thereby supporting application data protection with application lifecycle management;
   c) saving the application template comprising the Helm chart to a first repository;
   d) identifying the at least two releases of the containerized application and performing a one-to-one mapping for a Helm release name and a respective application release name of each of the at least two releases and saving the at least two mapped Helm release names to a second repository;
   e) identifying an incremental changed block of the application information comprising the CRD and saving the incremental changed block of the identified application information to the second repository; and
   f) identifying a persistent volume containing an incremental changed block of the application data and moving at least some of the incremental changed block of the application data from the persistent volume to a third repository.

2. The computer-implemented method of data protection for containerized applications of claim 1, the method further comprising:
   a) initiating a restore process for the containerized application comprising the application template comprising the Helm chart, application information comprising the CRD, and application data;
   b) retrieving the application template comprising the Helm chart from the first repository;
   c) executing the application template to generate a skeleton application and then shutting down the application skeleton;
   d) retrieving the incremental changed block of the identified application information comprising the CRD from the second repository;
   e) retrieving the at least some of the incremental changed block of the application data from the third repository; and
   f) rebooting the application skeleton to restore the containerized application.

3. The computer-implemented method of data protection for containerized applications of claim 1 wherein the incremental changed block of the application data comprises a full backup portion of the application data.

4. The computer-implemented method of data protection for containerized applications of claim 1 wherein the first, second, and third repository are the same repository.

5. The computer-implemented method of data protection for containerized applications of claim 1 wherein the first, second and third repository are different repositories.

6. The computer-implemented method of data protection for containerized applications of claim 1 wherein at least two of the first, second and third repository are the same repositories.

7. The computer-implemented method of data protection for containerized applications of claim 1 wherein the application information further comprises at least one of an IP address, a network configuration, a virtual machine, a number of virtual machines, an operating system, and a software version number.

8. The computer-implemented method of data protection for containerized applications of claim 1 wherein the repository comprises a S3 repository.

9. The computer-implemented method of data protection for containerized applications of claim 1 wherein the application data comprises a NFS format.

10. The computer-implemented method of data protection for containerized applications of claim 1 wherein the containerized application comprises a containerized application running on a hybrid cloud.

* * * * *